Jan. 2, 1923.
J. C. TOLLEFSON.
THRASHING MACHINE FEEDER TOOTH.
FILED SEPT. 7, 1921.
1,440,708.
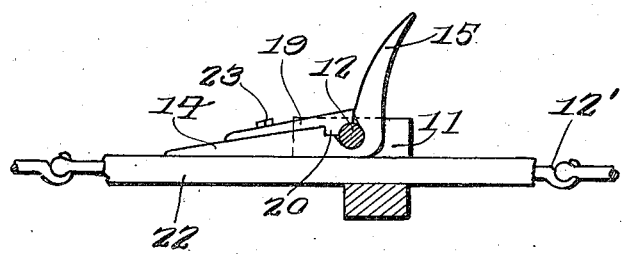
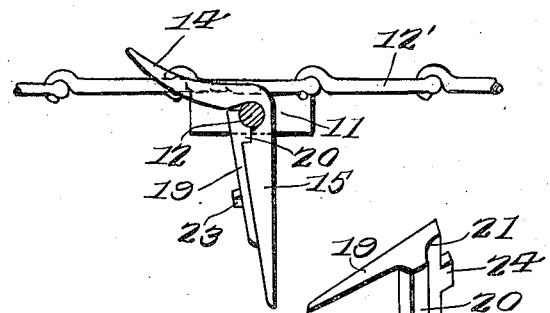
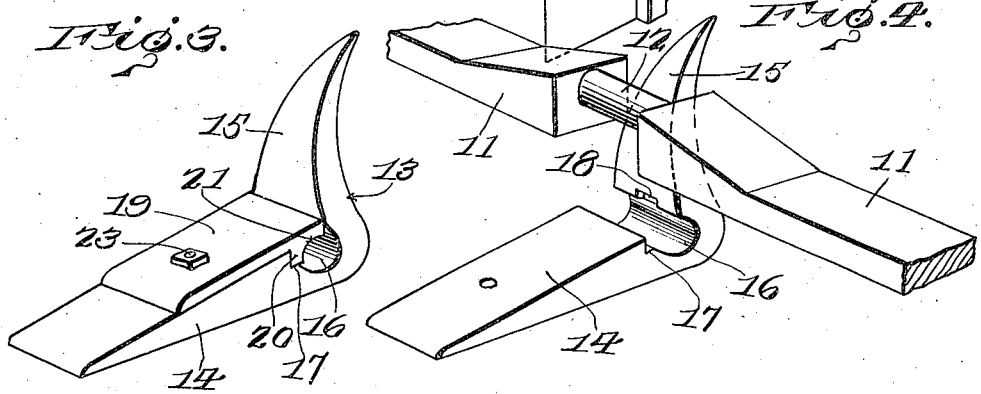
Inventor
John C. Tollefson
By
Attorney Patented Jan. 2, 1923.

1,440,708

UNITED STATES PATENT OFFICE.

JOHN C. TOLLEFSON, OF KANSAS CITY, KANSAS.

THRASHING-MACHINE FEEDER TOOTH.

Original application filed July 28, 1920, Serial No. 399,592. Divided and this application filed September 7, 1921. Serial No. 498,981.

*To all whom it may concern:*

Be it known that I, JOHN C. TOLLEFSON, a citizen of the United States, residing at Kansas City, in the county of Wyandotte, State of Kansas, have invented certain new and useful Improvements in Thrashing-Machine Feeder Teeth; and I do hereby declare the following to be a full, clear, and exact description of the invention, such as will enable others skilled in the art to which it appertains to make and use the same.

This invention relates to new and useful improvements in feeding attachments for thrashing machines, and particularly to the endless conveyors thereof.

One object of the invention is to provide a flight or tooth for the endless conveyor of a thrashing machine feeder which is operative on the material being fed to the thrasher during a portion of its travel, and automatically moved into inoperative position at the instant when the material is delivered into the thrasher.

Another object is to provide a tooth of this character which may be easily and quickly applied to the conveyor or removed therefrom, without the necessity of disturbing the conveyor.

Other objects and advantages will be apparent from the following description when taken in connection with the accompanying drawing.

In the drawing:

Figure 1 is a side elevation of a portion of a conveyor chain showing the tooth in grain conveying position.

Figure 2 is a side elevation of the parts shown in Figure 1, but with the tooth in inoperative position.

Figure 3 is a perspective view of the tooth in assembled position, but removed from the conveyor.

Figure 4 is a perspective view of the tooth and the support thereof, showing the tooth in position when being assembled or being removed.

Referring particularly to the accompanying drawing, there is shown a portion of a conveyor chain which is used in a feeder for a thrashing machine, such as shown in my pending application filed July 28, 1920, Ser. No. 399,592, and from which application the subject-matter of the present application is being divided. The conveyor chain comprises several parallel chains 12', which are connected by the transverse bars 11, the intermediate portion of each of which bars is formed into a cylindrical shaft portion 12.

The tooth comprises the main portion 13 having the right angularly extending arms 14 and 15, the latter of which is longitudinally curved in a direction away from the other one, while the said arm 14 is straight. In the interior angle between the arms 14 and 15 there is formed a transverse recess 16 which is of a diameter to receive the shaft portion 12 of a bar 11. In the outer wall of the recess 16 there is formed a transverse shoulder or ledge 17, and in the opposite wall of the recess there is formed a central smaller recess 18. The other member 19 of the tooth has a transverse rib 20 one face of which is transversely curved, as at 21, to embrace a portion of the shaft 12, and thus complete the bearing on which the tooth rocks with respect to the shaft.

Extending in parallel relation with and between the chains 12', is a fixed track on which the straight arm 14 rests and slides as the chains move, with the result that the curved arm 15 extends outwardly at right angles to the chain, in grain conveying position. The track terminates close to the entrance of the thrashing machine. (Not shown). When the straight arm 14 of the tooth passes the end of the track 22 it drops by gravity, being of considerable dimensions, with the result that the curved arm will move into a horizontal position so that the grain will readily pass thereover, into the thrashing machine.

Disposed through the member 19 and the arm 14, is a bolt 23, which holds the parts together.

The member 19 has a lug 24 which enters the smaller recess 18 of the portion 13, while the rib 20 rests on the shoulder or ledge 17, as clearly seen in the drawing, and especially in Figures 1 and 2.

When the straight arm 14 of the tooth has traveled around with the chain, and has reached the other or outer end of the track 22, it will again engage therewith and rest thereon to swing the arm 15 into vertical position for moving the grain.

To repair or replace a tooth, it is only necessary to remove the bolt 23, when the parts of the tooth will become separated and disengaged from the shaft 12.

Thus, as the chain conveyor travels, the teeth will stand in position to engage their arms 15 with the grain until the grain is fed into the thrashing machine, after which they fold down during their travel back along the lower laps of the conveyor until they reengage with the tracks at the outer ends of the feeder.

What is claimed is:

1. The combination with parallel conveyor chains and a longitudinal stationary track disposed therebetween, of bars secured to and extending between the chains, each of said bars having its intermediate portion in the form of a shaft, and a two part removable and rockable flight tooth mounted on the said shaft portion and including an arm arranged to slide on the stationary track and a curved material conveying arm, the latter arm being held in upright position when the former arm engages the track.

2. A flight tooth for a thrashing machine feeder chain comprising a substantially right angular member having a transverse shaft receiving recess in its interior angle, one wall of the recess having a smaller recess, the opposite wall having a longitudinal shoulder, one of the arms of the tooth being straight the recess of the first member, said second member having a rib removably seated on the said shoulder and being partly curved to complete the tubular bore partly formed by the recess of the first member, said second member having a lug engaged in the said smaller recess, and means for securing the parts of the tooth together.

In testimony whereof, I affix my signature, in the presence of two witnesses.

JOHN C. TOLLEFSON.

Witnesses:
 PAT McGILLIGAN,
 H. P. KIRBY.